United States Patent [19]
Hiranandani et al.

[11] Patent Number: 5,812,855
[45] Date of Patent: Sep. 22, 1998

[54] SYSTEM AND METHOD FOR CONSTAINT PROPAGATION CLONING FOR UNKNOWN EDGES IN IPA

[75] Inventors: Seema Hiranandani, Menlo Park; Wingsturn Wilson Ho, San Mateo, both of Calif.

[73] Assignee: Silicon Graphics, Inc., Mountain View, Calif.

[21] Appl. No.: 657,197

[22] Filed: Jun. 3, 1996

[51] Int. Cl.$^6$ .................................................. G06F 9/45
[52] U.S. Cl. ...................... 395/709; 395/707; 395/708; 707/10; 707/103; 707/203
[58] Field of Search .................. 395/708, 709, 395/710, 707, 183.14, 706, 685; 707/10, 103, 203

[56] References Cited

U.S. PATENT DOCUMENTS

| | | | |
|---|---|---|---|
| 5,175,856 | 12/1992 | Van Dyke et al. | 395/704 |
| 5,179,702 | 1/1993 | Spix et al. | 395/709 |
| 5,457,799 | 10/1995 | Srivastava | 395/709 |
| 5,644,709 | 7/1997 | Austin | 395/185.06 |
| 5,655,122 | 8/1997 | Wu | 395/709 |

OTHER PUBLICATIONS

Edinburgh Portable Compilers Ltd. "EPC Modula–2" from http://www.epc.co.uk/em2.html, 1997.

Marlowe, et al. "Hybrid incremental alias algorithms", IEEE, pp. 428–437, 1991.

Chow, "Minimizing register usage penalty at procedure calls", ACM Press, Proc. of the SIGPLAN'88 Conf. on Programming Language, pp. 85–94, Jun. 1988.

Cooper, et al., "The impact of interprocedural analysis & optimizations in R.sup.n programming environment", pub. in ACM Trans. on programming languages & syst, Oct. 1986.

Ferrante, et al., "The program dependence graph and its use in optimization", IBM Technical Report RC–10543, Computer Science, pp. 1–33, Jun. 1984.

Triolet, "Interprocedural analysis based restructuring of programs", Proc. on the international workshop on parallel algorithms & architectures; pub. by North–Holland, pp. 203–217, Apr. 1986.

Kuck, et al. "Dependence graphs and compiler optimizations", 8th annual ACM Symposium on principles of programming languages, (POPL), pp. 207–218, Jan. 1981.

Lomet, "Data flow analysis in the presence of procedure calls", pp. 559–571, Nov. 1977.

*Primary Examiner*—Emanuel Todd Voeltz
*Assistant Examiner*—Cuong H. Nguyen
*Attorney, Agent, or Firm*—Sterne, Kessler, Goldstein & Fox P.L.L.C.

[57] ABSTRACT

The present invention provides a system and method for solving interprocedural problems on incomplete call graphs. For a given program, the present invention constructs a standard call graph on which the edges are updated with summary information needed to solve a given interprocedural problem such as constant propagation. Each node of the call graph having an unknown incoming edge is cloned. The call graph is then updated so that the unknown incoming edges are directed to the clone nodes and the known edges are directed to the original nodes. This results in a purified call graph on which an interprocedural problem can be solved. The present invention then creates a real clone of the procedure associated with each clone node of the call graph. The real clones are optimized according to the interprocedural solution. The present invention updates the known procedure calls of the program to call the real clones. Therefore, known procedure calls take advantage of optimized code, while unknown procedure calls continue to call unoptimized code.

24 Claims, 8 Drawing Sheets

SYSTEM AND METHOD FOR CONSTRAINT PROPAGATION CLONING FOR UNKNOWN EDGES IN IPA

BACKGROUND OF THE INVENTION

1. Field of the Invention

This invention relates to computer software compilation systems, and more specifically to a compiler that performs interprocedural analysis and optimization.

2. Related Art

A. Compilers and Interprocedural Analysis (IPA)

A program comprises one or more external source code files. Each source code file contains one or more program units. A program unit is a subroutine, function, or other separately compilable software entity. A compiler translates a program to one or more object files. In particular, a compiler compiles the source files of a program one at a time. For each source file, the compiler works on one program unit at a time and generates a corresponding object file. The developer does not have to compile an entire program at one time, but rather, can compile the program in separate pieces as it is developed. After an entire program is compiled, a linkage editor processes all of the object files of the program and generates an executable program. Therefore, in a conventional compilation system, a developer invokes two separate steps: a compilation step and a link step.

There are two major phases of a compiler: a front end and a back end. The front end of a compiler consists of those phases that depend on the source language and are largely independent of the target computer. The front end typically performs lexical and syntactic analysis, creates the symbol table, performs semantic analysis, and generates intermediate code which is an intermediate representation of the source code.

The back end of a compiler includes those phases of compilation that depend on the target computer and generally do not depend on the source language, but depend on the intermediate code. The back end typically performs code optimization on the intermediate representation and generates the target object files.

An additional feature of conventional compilation systems pertains to the creation and use of dynamic shared objects (DSOs). A DSO is a binary object of a partial program. Typically a developer only has access to the object files of a DSO and not to the corresponding source code. The DSO was compiled separately from the developer's program. The developer links the object files of his program with the DSO to gain access to the program units contained in the DSO. Therefore, conventional compilation systems provide a developer with the ability to generate either an executable file or a DSO when linking object files.

A disadvantage of a conventional compilation system is that during compilation the compiler only has local information about the program unit on which the compiler is currently working. The compiler does not have any global information pertaining to the entire program or to the relationships between the program units of the program. Because of this lack of global information, the back end of the compiler is unable to perform certain optimizations, such as optimizing the operations involving global variables and the passing of constant parameters.

A well known technique that solves this disadvantage of conventional compilation systems is interprocedural analysis (IPA). IPA is a phase that is added to a compilation system to analyze an entire program and collect global information related to the program units. Global information includes global variables and how the multiple program units manipulate and reference the global variables. Once the global information is collected, it is then passed to the optimizer as part of the back end of the compilation system. Thus, when the optimizer optimizes a program unit, the optimizer accesses this global information and performs additional and more aggressive optimization pertaining to global variables. IPA improves the efficiency of the generated object code by providing optimization at a global level, thereby improving the run-time performance of the executable program.

B. IPA User Interface

Conventional compilation systems use a standard user interface for compiling source files of a software program. More specifically, a developer first generates a Make file to describe how the program is to be compiled. Make files are a standard UNIX utility that are well known in the relevant art. The Make file is used to invoke a compiler and translate the source files into object files. Conventional object files are denoted by a standard ".o" suffix. After all of the object files are created, a linkage editor combines the object files and generates an executable program.

Conventional IPA compilation systems, compilation systems employing an IPA phase, drastically depart from the standard user interface used by conventional non-IPA compilation systems. First, conventional IPA compilation systems require a developer to use a new description, or non-standard, IPA format in a Make file. This extra step is inconvenient to developers in that they must learn the new IPA specific formats.

Second, these systems further require the developer to invoke a separate IPA step before the link step. The developer must compile all of the source files, execute an IPA step on the object files, and then invoke the linkage editor to generate an executable image of the program. Once again, to use IPA during compilation, developers must perform an extra step that departs from conventional compilation systems.

Third, the developer can only perform IPA on the entire program. The developer cannot select different levels of optimization at the source file level; that is, the developer cannot compile one source file with IPA and a second source file without IPA. Conventional IPA compilation systems treat the IPA phase as a black box to which developers have no control. All of the files input to the IPA phase of a conventional IPA compilation system must be of the same type.

Fourth, conventional IPA compilation systems do not provide a mechanism for handling DSOs. Because a DSO is compiled separately from a developer's program, the IPA compilation system does not have access to the source code or the global information obtained from compiling the source code. Therefore, conventional IPA compilation systems do not allow a developer to link a program with a DSO. Furthermore, conventional IPA compilation systems only generate an executable program. A developer cannot compile source code using IPA and generate a binary object of a partial program or DSO.

Fifth, conventional IPA compilation systems output from the IPA phase one large output file which takes a long time for the compiler back end to process. Therefore, conventional IPA compilation systems exhibit large delays in compilation due to the processing of the one large file.

These requirements of conventional IPA compilation systems impose a burden on the developer to learn a new compilation interface and a detailed knowledge of how the compilation system uses IPA. Therefore, there is a need for an IPA compilation system that uses the standard compilation user interface to include the use of DSOs.

C. Constant Propagation

Constant propagation is an optimization technique that deduces at compile time that the value of an expression or variable is a constant. The constant is then propagated through the source code, thereby allowing further optimizations to occur; such as, dead code elimination and loop optimization. Constant propagation is most useful when optimizing parameter values and global variables. In these cases, constants can be propagated into subroutines, providing for greater optimization of the source code.

Conventional compilation systems, however, cannot perform constant propagation optimization across program units. As discussed above, conventional compilation systems work on one program unit at a time and do not retain summary information spanning program unit boundaries. Therefore, these systems are limited to performing constant propagation within one program unit at a local level only.

Conventional IPA compilation systems perform constant propagation optimization across program units because these systems retain summary information on the program unit relationships. A problem arises, however, when a subroutine of a program is externally visible and can be accessed from a binary object or DSO that is not an original part of the program. In these cases, the DSO or other source code did not go through the IPA phase of the conventional IPA compilation system. Therefore, the system does not have any summary information on the program units of the DSO and cannot perform constant propagation from the external calling subroutines to the called subroutines. Conventional IPA compilation systems do not solve this problem. Instead, conventional IPA compilation systems require a complete program, without any unknown subroutine calls originating from a DSO or other external subroutine, as input before performing constant propagation.

Therefore, there is a need for an IPA compilation system that performs constant propagation optimization on an incomplete program having externally callable subroutines.

SUMMARY OF THE INVENTION

A. Interprocedural Analysis (IPA) User Interface

The present invention provides an IPA compilation system that a developer invokes and uses via a standard compilation user interface. The present invention allows the developer to use a standard UNIX Make file, changing only compile options, to compile a program with IPA. By preserving this traditional compilation user interface, developers do not have to learn a new user interface, nor learn the details of IPA implementation and an IPA specific user interface. The present invention facilitates the use of an IPA phase.

The present invention restructures the compile command to invoke only a compiler front end and a summary phase, but not a compiler back end. The compile command outputs a data file with a ".o" suffix, called an intermediate ".o" file, whereas a conventional compile command outputs a binary object ".o" file. Therefore, from the developer's point of view, the compilation command is preserved because an ".o" file is generated via compilation. It is transparent to the developer that the ".o" file has a different, extended object file format compared to the traditional object ".o" file.

The present invention also restructures the traditional link command to invoke an interprocedural optimization phase, a compiler back end, and a final link step. Similar to the compilation step, the present invention preserves the developer's user interface. The developer invokes a link command which inputs ".o" files and generates an executable image. However, the input ".o" files are not binary object files, as with conventional compilation systems, but are files containing an intermediate representation and summary information. The link command invokes the interprocedural optimization phase before invoking the compiler back end and finally the linker. Therefore, the present invention hides all implementation details pertaining to IPA functionality from the developer.

The present invention further provides a developer with the option of performing IPA on a subset of the program; that is, compile one source file with the IPA compile option and compile a second source file without the IPA compile option. To accommodate this compilation option, the linker accepts both intermediate ".o" files and binary object ".o" files as input. This feature provides a developer with greater control and flexibility in optimizing a program. A developer can generate a program using archived libraries, DSOs received from external sources, or can use source files for which the IPA compiler option was not chosen.

The present invention further provides a developer with the option of accessing external binary objects, or DSOs, in designing and implementing a program. After performing its analysis of externally visible symbols in the program, the present invention modifies the externally visible symbols so that they are no longer externally visible. Therefore, if a DSO is altered at a later date to include a new reference to a previously externally visible symbol of the program, the DSO will no longer execute properly. The program will generate an error message when executing the DSO. Therefore, the present invention allows a developer to use DSOs when implementing a program and compiling with an IPA option by providing safeguards against external references.

The present invention further provides a developer with the option of linking and generating an executable program or a DSO via the link command. This feature, which is not available with conventional IPA compilation systems, allows a developer greater flexibility in designing and implementing multiple programs and reusing software.

The present invention further provides a developer with faster compilation and linking. The IPA phase of the link command outputs one or more intermediate files. If multiple intermediate files are generated, the link command then invokes multiple instances of the compiler back end, such that each instance inputs an intermediate file and processes it in parallel with the other instances. Parallel processing of the intermediate files results in faster compilation and linking.

Additional features of this invention will become apparent from the following detailed description of the best mode for carrying out the invention and from appended claims.

B. Constant Propagation

The present invention solves the problem of conventional IPA compilation systems not performing constant propagation on a subset of a program by making a clone, or copy, of the subroutines that may be called from the outside. The present invention does not perform IPA optimization on the original subroutine, but has the original subroutine retain its original structure and behavior. Therefore, all unknown calls from external objects to subroutines in the program are directed to the original subroutine.

In contrast, the present invention performs IPA optimization on the clone subroutine with respect to the known calls to the subroutine from other subroutines in the program. The present invention takes advantage of parameter values associated with the known calls to the subroutine from within the program for its IPA optimization. The known calls are then updated to reference the IPA optimized clone subroutine and not the original, non-IPA optimized subroutine.

Additional features of this invention will become apparent from the following detailed description of the best mode for carrying out the invention and from appended claims.

BRIEF DESCRIPTION OF THE FIGURES

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS

1. Host System of the Preferred Embodiment

Figure 1:
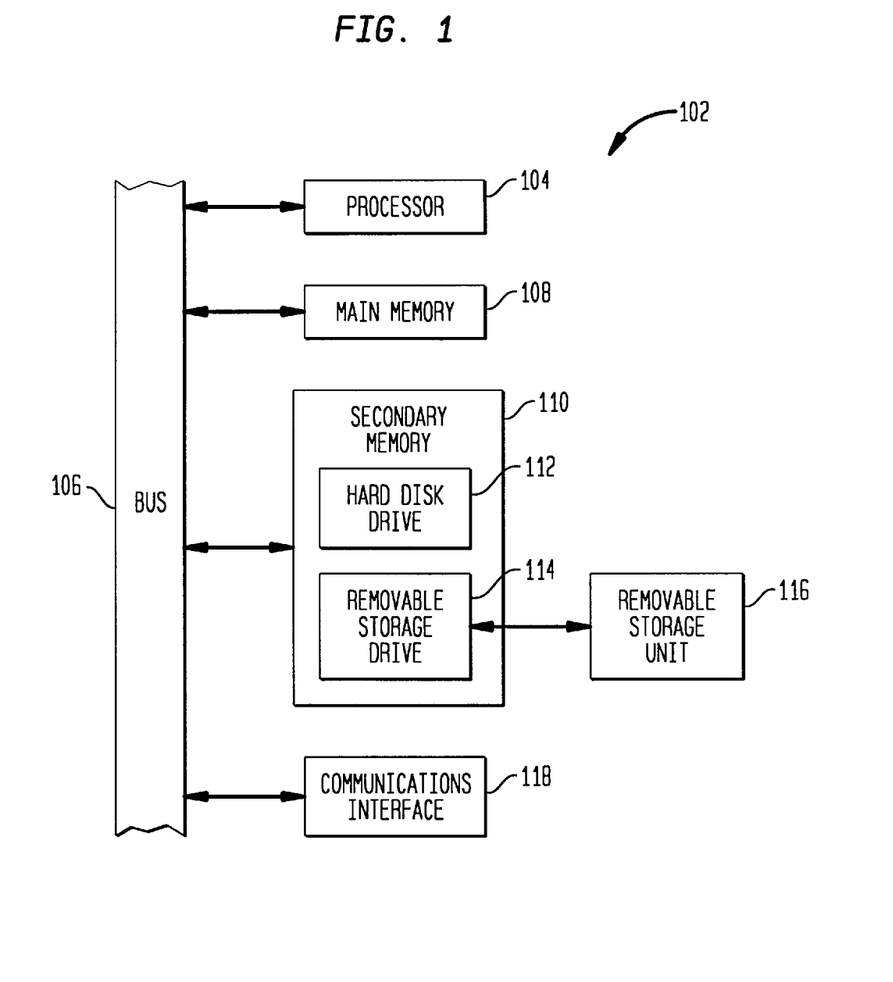
FIG. 1 is an exemplary computer system of the preferred embodiment.

The chosen embodiment of the present invention is computer software executing within a computer system. FIG. 1 shows an exemplary computer system. The computer system 102 includes one or more processors, such as a processor 104. The processor 104 is connected to a communication bus 106.

The computer system 102 also includes a main memory 108, preferably random access memory (RAM), and a secondary memory 110. The secondary memory 110 includes, for example, a hard disk drive 112 and/or a removable storage drive 114, representing a floppy disk drive, a magnetic tape drive, a compact disk drive, a program cartridge and cartridge interface (such as that found in video game devices), a removable memory chip (such as EPROM, or PROM), etc. which is read by and written to by a removable storage unit 116. Removable storage unit 116, also called a program storage device or a computer program product, represents a floppy disk, magnetic tape, compact disk, etc. As will be appreciated, the removable storage unit 116 includes a computer usable storage medium having stored therein computer software and/or data. The removable storage drive 114 reads from and/or writes to a removable storage unit 116 in a well known manner.

The computer system 102 may also include other similar means for allowing computer programs or other instructions to be loaded. Such means can include, for example, a communications interface 118. Communications interface 118 allows software and data to be transferred between computer system 102 and external devices. Examples of communications interface 118 can include a modem, a network interface (such as an Ethernet card), a communications port, etc. Software and data transferred via communications interface 118 are in the form of signals which can be electronic, electromagnetic, optical or other signals capable of being received by communications interface 118.

In this document, the term "computer program product" is used to generally refer to removable storage unit 116, a hard disk installed in hard disk drive 112, and signals transferred via communications interface 118. These computer program products are means for providing software to a computer system 102.

In an embodiment where the invention is implemented using software, the software may be stored in main memory 108, or in a computer program product and loaded into computer system 102 using removable storage drive 114, hard disk drive 112, or communications interface 118. The software, when executed by the processor 104, causes the processor 104 to perform the functions of the invention as described herein.

In another embodiment, the invention is implemented primarily in hardware using, for example, a hardware state machine. Implementation of the hardware state machine so as to perform the functions described herein will be apparent to persons skilled in the relevant arts.

The preferred embodiment of the present invention is directed to execute on a computer system 102 in which the processor 104, such as Intel, Apple, MIPs, etc., executes the UNIX operating system. The preferred embodiment of the present invention is implemented in software, and more specifically, is written in the programming languages C and C++. The preferred embodiment is described in these terms for convenience purpose only. Other comparable computer systems 102, processors 104, and programming languages could alternatively be used.

2. Overview of Conventional Compiler Systems

Figure 2:
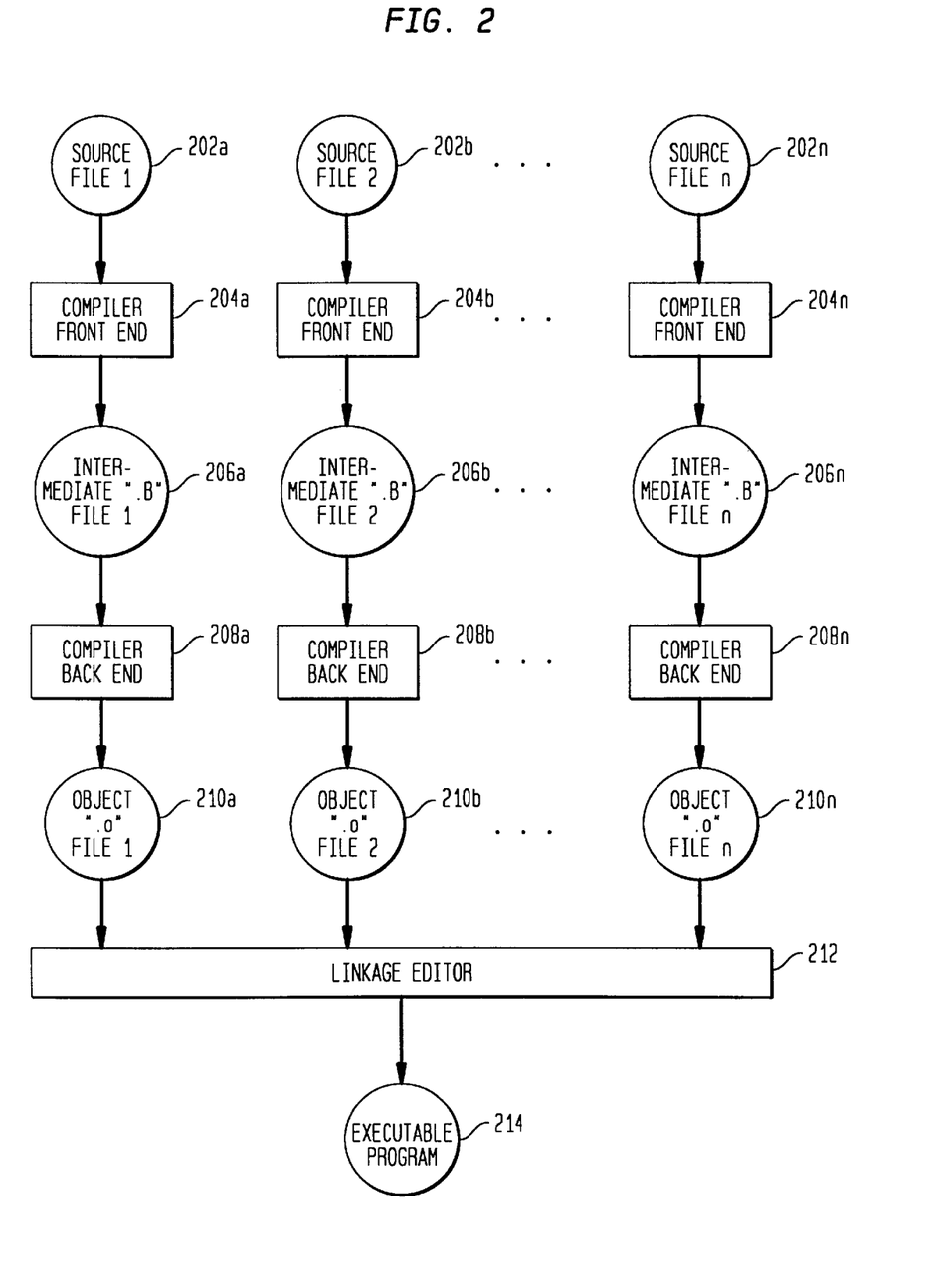
FIG. 2 is a block diagram illustrating a conventional compilation system.

The present invention is directed to a computer compilation system. The data flow diagram of FIG. 2 illustrates the components of a conventional compilation system and the flow of data between the compilation components. The components include: a compiler front end 204a–204n, a compiler back end 208a–208n, and a linkage editor 212.

In operation, a developer submits one or more source files 202a–202n to the compiler. Each source file 202a–202n contains one or more program units of a software program. A compiler front end 204a–204n receives a source file 202a–202n and produces an internal representation of the source file 202a–202n. More specifically, multiple instances of the compiler front end 204a–204n execute in parallel. Each instance of a compiler front end 204a–204n processes a source file 202a–202n independent of the others. The internal representation of the source file 202a–202n is contained in a binary file with a ".B" suffix, called an intermediate ".B" file 206a–206n, such that each intermediate ".B" file 206a–206n corresponds to a source file 202a–202n.

A compiler back end 208a–208n inputs and analyzes the intermediate ".B" files 206a–206n. Based on its analysis, the compiler back end 208a–208n optimizes the intermediate representation, thereby making the code more efficient. The compiler back end 208a–208n then generates object code in a file with a ".o" suffix, called the object ".o" file 210a–210n, such that each object ".o" file 210a–210n corresponds to a source file 202a–202n and an intermediate file 206a–206n. More specifically, multiple instances of the compiler back end 208a–208n execute in parallel. Each instance of a compiler back end 208a–208n processes an intermediate ".B" file 206a–206n independent of the others.

Once all of the source files 202a–202n have been successfully compiled, the developer invokes the linkage editor 212 to link the object ".o" files 210a–210n. The linkage editor 212 creates an executable program 214 that can be executed on a computer system 102.

Figure 3:
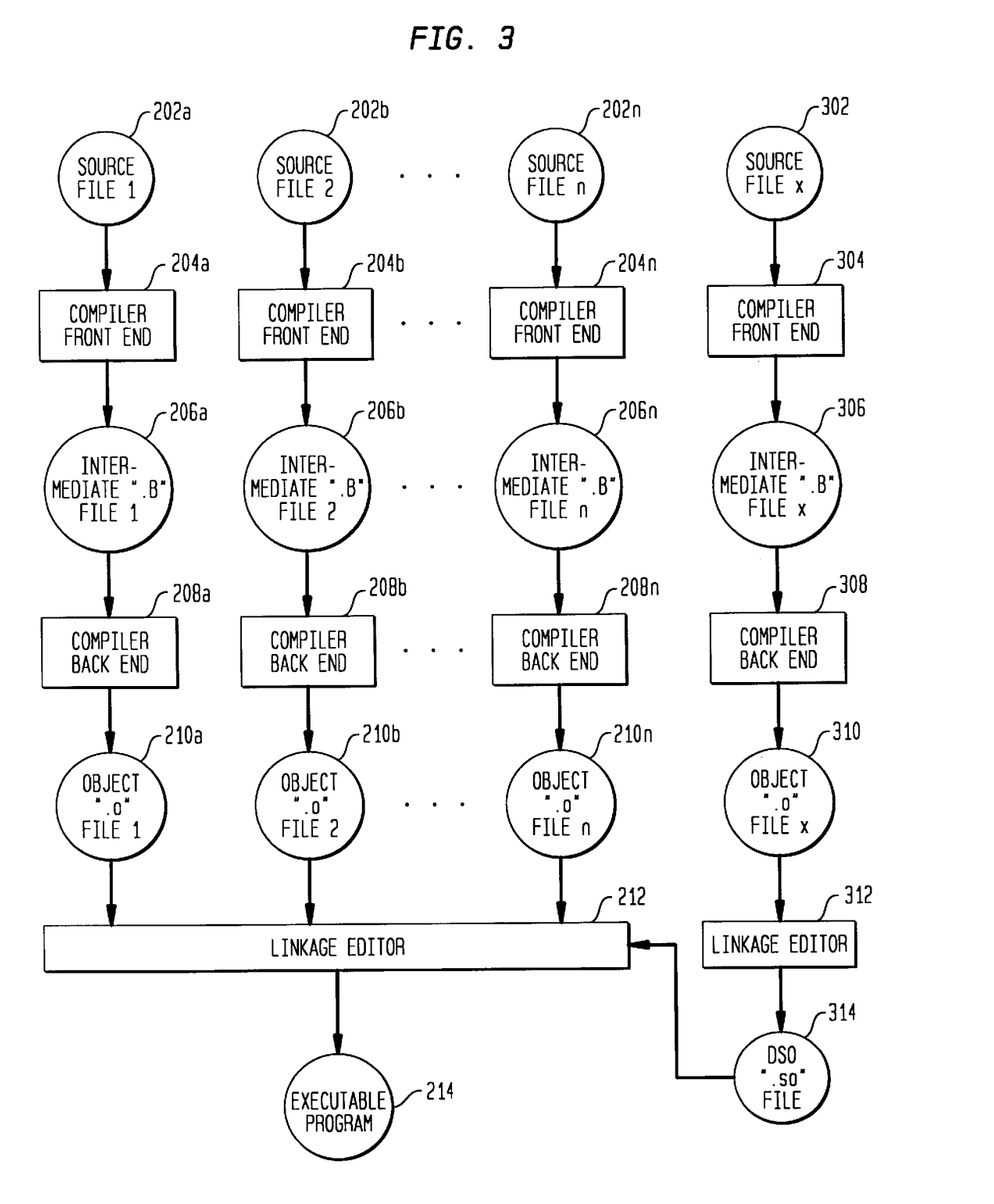
FIG. 3 is a block diagram illustrating the conventional compilation system with dynamic shared objects (DSOs)

The data flow diagram of FIG. 3 illustrates the components of a conventional compiler and the flow of data between the compiler components including the generation and use of a dynamic shared object (DSO). As described above, a DSO is a binary object of a partial program. A DSO is developed and compiled separately from a developer's program such that the developer does not have access to the source code of the DSO, but only has access to the object code. Typically, a developer accesses a DSO by adding references to the subroutines and global variables of the DSO in his program and linking his program with the DSO.

Referring again to FIG. 3, a source file x 302 is developed separate from the source files 202a–202n of the developer's program. Similar to the conventional compilation system described above, the source file x 302 is compiled and linked. The source file x 302 is submitted to a compiler front end 304 which generates an intermediate ".B" file x 306. The compiler back end 308 takes the intermediate ".B" file x 306 as input and generates an object ".o" file x 310. The object ".o" file x 310 is then linked into a DSO ".so" file 314. It should be understood that the DSO is described in terms of having a single source file, source file x 302, for convenience purposes only. It would be readily apparent to one skilled in the relevant art to generate a DSO ".so" file 314 from source code contained in multiple source files.

Upon the creation of a DSO ".so" file 314, the developer can create the source files 202a–202n of his program and add references to the externally visible subroutines and global variables of the DSO ".so" file 314. Then, when the developer invokes the linkage editor 212 to link the object ".o" files 210a–210n of his program, the linkage editor 212 pulls in the binary object of the DSO ".so" file 314. Therefore, the developer's executable program 214 can access the DSO code and executes the DSO code at run time according to the DSO references.

3. The Preferred Embodiment of an Interprocedural Analysis (IPA) User Interface

Figure 4:
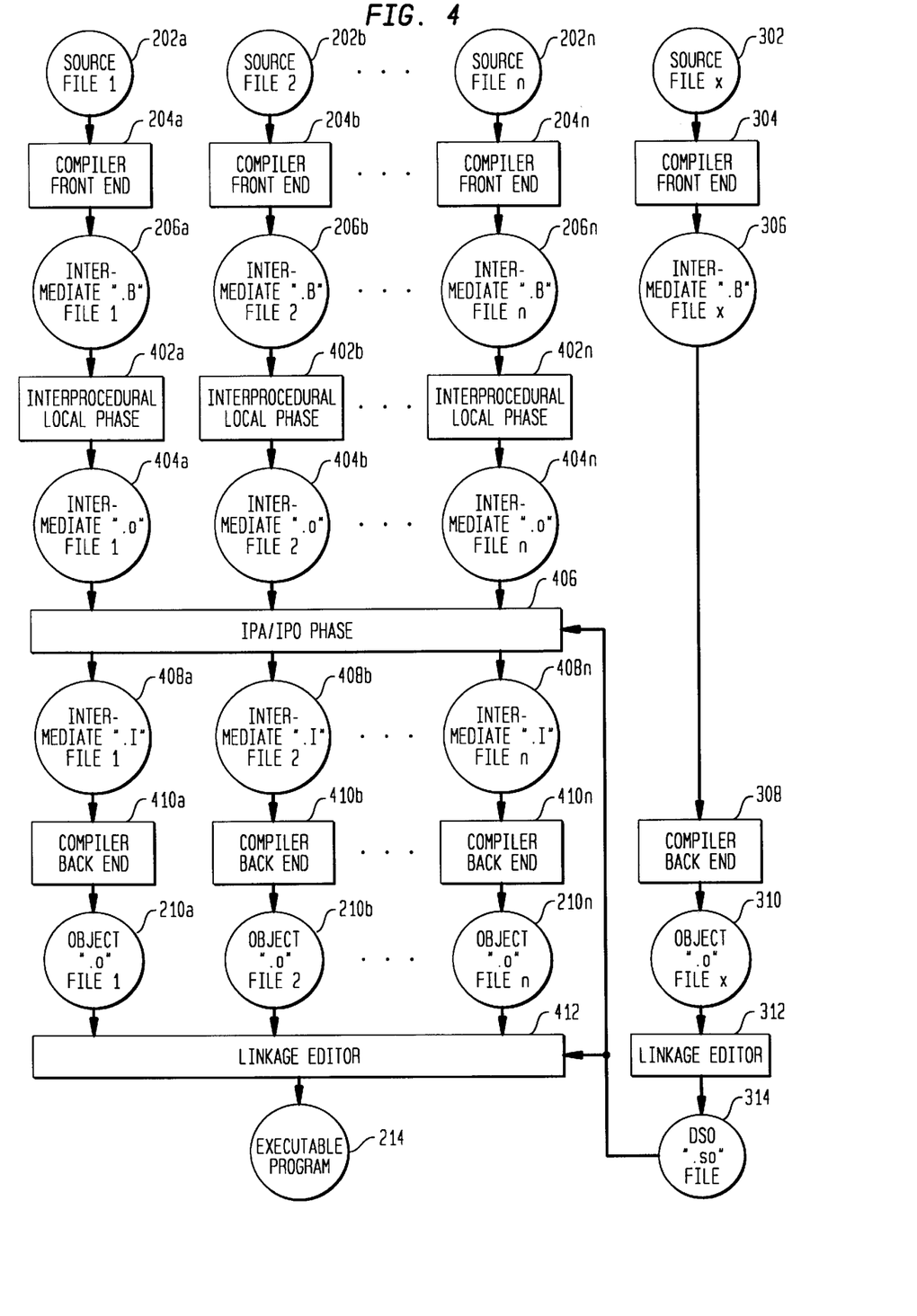
FIG. 4 is a block diagram illustrating the preferred embodiment of the present invention for an interprocedural analysis user interface.

The data flow diagram of FIG. 4 illustrates the preferred embodiment of the present invention for an interprocedural analysis (IPA) user interface. More specifically, FIG. 4 illustrates the components of the preferred embodiment of an IPA compilation system and the flow of data between those components. The components of a preferred IPA compilation system include: a compiler front end 204a–204n, an interprocedural local phase 402a–402n, an interprocedural analysis (IPA)/interprocedural optimization (IPO) phase 406, a compiler back end 410a–410n, and a linkage editor 412.

In the preferred embodiment of the present invention, a developer invokes and uses an IPA compilation system with the same standard user interface as a conventional compilation system. More specifically, the developer employs the standard two step process when generating an executable image of a program: compile and link. In contrast, as discussed above, conventional IPA compilation systems require the developer to learn and use a non-standard user interface including new compilation commands and file suffixes.

In the compile step, a developer submits one or more source files 202a–202n to the compiler. In the preferred embodiment, the developer uses the standard UNIX Make utility to describe how to compile the source files 202a–202n, such as the order of compilation. The developer simply adds a new compilation flag to a compile command line to invoke the IPA phase of the present invention. The preferred embodiment of the flag is "-IPA." Therefore, when the compiler front end 204 parses the "-IPA" flag, it will automatically process the source file 202a–202n under IPA.

Each source file 202a–202n contains one or more program units of a software program. The compiler front end 204a–204n receives each source file 202a–202n and produces an internal representation of the source file 202a–202n. The internal representation is contained in a data file with a ".B" suffix, called an intermediate ".B" file 206a–206n, such that each intermediate ".B" file 206a–206n corresponds to a source file 202a–202n. As discussed above with FIG. 2, multiple instances of the compiler front end 204a–204n execute in parallel. Each instance of a compiler front end 204a–204n processes a source file 202a–202n independent of the others.

The interprocedural local phase 402a–402n inputs and analyzes the intermediate ".B" files 206a–206n. The interprocedural local phase 402a–402n summarizes information within a program unit that could affect or be affected by other program units. Similar to the compiler front end 204a–204n, multiple instances of the interprocedural local phase 402a–402n execute in parallel, such that each instance works on one program unit at a time. It is readily apparent and well known to one skilled in the art to determine the necessary summary information to retain for minimal IPA processing.

The interprocedural local phase 402a–402n generates a second intermediate representation of a source file 202a–202n which is contained in a file with a ".o" suffix, called an intermediate ".o" file 404a–404n. The intermediate ".o" files 404a–404n are written in an extended object file format and contain the intermediate ".B" file 206a–206n information and the summary information within a program unit that might later be used to construct a relationship between inter-program units. In addition, the summary information contains the compiler options associated with each intermediate file. Therefore, the compiler back end 410a–410n can perform the appropriate level of optimization on each file because the IPA/IPO phase 406 has access to the compilation options in each intermediate ".o" file 404a–404n. This provides the user with the flexibility of optimizing each file at a different level. In contrast, conventional IPA compilation systems do not maintain the compiler options between compiler front end 204a–204n and the compiler back end 410a–410n because an IPA phase is executed between the two.

In the preferred embodiment of the present invention, the intermediate ".o" files 404a–404n are written in the standard executable and linking format (ELF). ELF is well known in the art and is an international standard for describing object files. Briefly stated, ELF is a flexible way of organizing a binary file. An object file is partitioned into multiple sections, each section having a type that describes the information contained in its corresponding section.

The preferred embodiment defines and adds new types, thereby adding new sections, to the ELF format for describing the intermediate ".B" files 206a–206n. The new types and sections contain the intermediate representation and the summary information as determined by the interprocedural local phase 402a–402n. A person skilled in the related art would know the needed information for the new ELF types and sections, and would know how to define and add the new types and sections using the ELF standard. It should be understood, however, that the preferred embodiment of the intermediate ".o" files 206a–206n is described using the ELF standard for convenience purpose only. It would be readily apparent to one skilled in the related art to use a comparable object file format containing the additional summary information.

The ".o" suffix of the intermediate ".o" files 404a–404n is a well known and standard suffix for binary object files that is recognized by conventional compiler tools. Therefore, the present invention recognizes two types of ".o" files: intermediate ".o" files 404a–404n and object ".o" files 210a–210n. The benefit of using the ".o" suffix for the intermediate files is that other compiler tools that require the ".o" suffix will continue to execute properly. These compiler tools, however, will not recognize the new types and sections in the ELF format.

After all of the source files 202a–202n have been compiled, the developer links the object files comprising the program. In the link step, the IPA/IPO phase 406 inputs and analyzes the intermediate ".o" files 404a–404n. The IPA/IPO phase 406 uses the summary information contained in the intermediate ".o" files 404a–404n and performs cross-program unit analysis and optimization. It is readily apparent and well known to one skilled in the art to implement the necessary IPA and IPO functionality.

In the preferred embodiment of the IPA\IPO phase 406, the IPA\IPO phase 406 inputs two types of files having the ".o" suffix : intermediate ".o" files 404a–404n and object ".o" files 210a–210n. For intermediate ".o" files 404a–404n, the IPA/IPO phase 406 processes the files and forwards the files to the compiler back end 410a–410n. For object ".o" files 210a–210n, the IPA/IPO phase 406 and the compiler back end 410a–410n On are skipped and the files are forwarded directly to the linkage editor 412. This feature provides a developer with the option of compiling and linking a program in which only some of the program is processed with IPA. In addition, the developer can use ".o" files or a library of ".o" files from other sources.

For each intermediate ".o" file 404a–404n, the IPA/IPO phase 406 performs analysis and optimization based on the summary information, and then generates modified or optimized versions of the program units in intermediate ".I" files 408a–408n. In an alternative embodiment, however, the IPA/IPO phase 406 could generate one combined intermediate ".I" file 408a–408n instead of separate intermediate ".I" files 408a–408n. An intermediate ".I" file 408a–408n contains one or more optimized program units that have the extra, global information incorporated into them by the IPA/IPO phase 406. Therefore, the compiler back end 410a–410n has access to all the summary information that it needs to perform aggressive optimization. This preferred embodiment results in the compiler back end 410a–410n not needing any changes. More specifically, the compiler back end 410a–410n does not have to be taught to understand the summary information. The IPA/IPO phase 406 performs all of the work to merge the needed information into each intermediate ".I" file 408a–408n.

The compiler back end 410a–410n inputs the intermediate ".I" files 408a–408n and optimizes the internal representation of the source code accordingly. In the preferred embodiment having multiple intermediate ".I" files 408a–408n, multiple instances of the compiler back end 410a–410n are invoked such that the intermediate ".I" files 408a–408n are compiled and processed in parallel. This parallel processing speeds up compilation and linking. Parallel processing of the intermediate ".I" files 408a–408n is possible because the IPA/IPO phase 406 invokes the compiler back end 410a–410n with the compiler options associated with each intermediate ".I" file 408a–408n. It would be readily apparent to one skilled in the relevant art to store the compiler options, thereby providing for parallel processing at the compiler back end 410a–410n.

Similar to conventional compilation systems, the compiler back end 410a–410n generates binary object ".o" files 210a–210n. After the developer compiles all of the source files 202a–202n of the program, the developer can invoke the linkage editor 412. The linkage editor 412 inputs the object ".o" files 210a–210n resulting from the compilation and generates an executable program 214. The developer can then execute his program on a computer system 102. Alternatively, upon direction from the developer, the linkage editor 412 can link the object ".o"files 210a–210n and generate a DSO. The developer can use the DSO in designing and implementing other programs.

When linking a DSO ".so" file 314 with the object ".o" files 210a–210n of a program, the IPA/IPO phase 406 and the linkage editor 412 must safeguard the developer's program from future modifications made to the DSO. For example, assuming that the developer's program contains externally visible symbols, such as global variables or subroutines, a first version of a DSO may not reference one of the program's externally visible symbols, but a second version of the DSO may. Therefore, to safeguard the developer's program from unchecked updates to the DSO, the IPA/IPO phase 406 inputs the DSO ".so" file 314 and determines which of the program's externally visible symbols may not be referenced from the outside. For each of those unreferenced symbols, the IPA/IPO phase 406 modifies the definition of the symbol in the main program so that the symbol is no longer externally visible. Therefore, if a new version of a program or DSO attempts to reference the symbol during run-time, the program generates an error message instead of executing incorrectly. This feature of the IPA/IPO phase 406 protects the IPA optimization assumptions made during the compilation of the developer's program.

4. Overview of Call Graphs Using a Conventional IPA Compilation System

A call graph is a standard and well known graphical representation of software subroutines and the dependencies between those subroutines. More specifically, each node of a call graph represents a subroutine and an edge between two nodes represents one subroutine calling, or invoking, another subroutine. A node of a call graph represents either a known subroutine of the program or an external, unknown subroutine, such as a subroutine in a DSO or a subroutine compiled without the IPA option. The direction of an edge indicates which node or subroutine calls another.

Each edge between known subroutines is also annotated indicating the value of the parameters passed between the known subroutines. As described above, an IPA phase of a conventional IPA compilation system generates summary information pertaining to the entire program including information pertaining to constants. Using this summary information, the IPA phase builds the call graph and annotates the edges.

An edge between an external, unknown subroutine and a known subroutine, is called an unknown edge. An unknown edge is not annotated because the external subroutine was compiled separately from the original subroutines of the program. Therefore, the IPA phase does not have any summary information pertaining to the parameter values passed between the external subroutine and the known subroutine. These edges are unknown and are not annotated.

Figure 5:
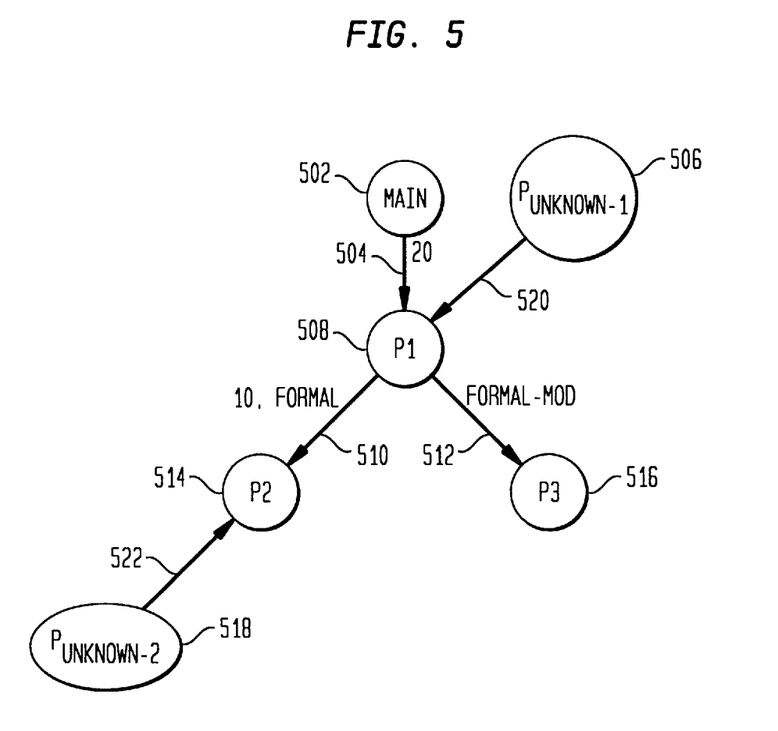
FIG. 5 is a block diagram illustrating a conventional call graph with unknown edges.

The block diagram of FIG. 5 illustrates a conventional call graph with unknown edges. The nodes are the subroutines or procedures Main 502, P1 508, P2 514, P3 516, $P_{unknown-1}$ 506, and $P_{unknown-2}$ 518. The edges are the directional arrows drawn between the nodes. Therefore, the call graph of FIG. 5 indicates that procedure Main 502 calls procedure P1 508, procedure P1 508 calls both procedure P2 514 and procedure P3 516, unknown procedure $P_{unknown-1}$ 506 calls procedure P1 508, and unknown procedure $P_{unknown-2}$ 518 calls procedure P2 514. Procedures $P_{unknown-1}$ 506 and $P_{unknown-2}$ 518 are unknown procedures because they were not developed as part of the program, but may be included in a partial program or DSO that the developer linked into the program.

For convenience purposes only, the following procedure definitions are provided to further describe the call graph of FIG. 5:

```
Main ()
    call P1 (20)
    ...
end
P1 (int i)
    call P2 (10, i)
    call P3 (i)
    ...
end
P2 (int x, int y)
    ...
end
P3 (int j)
    j = j + 3
    ...
end
```

Based on the above procedure definitions, the edges of the call graph are annotated according to the actual parameter values passed to the subroutines. Therefore, edge 504 is annotated with the value "20" to indicate that a constant is passed from procedure Main 502 to procedure P1 508. Edge 510 is annotated with the values "10" and "formal" to indicate that the two parameters are passed from procedure P1 508 to procedure P2 514. The "10" represents a constant, whereas the value "formal" represents that a formal parameter of unknown value is passed. Edge 512 is annotated with the value "formal_mod" to indicate that the procedure P3 516 may modify the formal parameter that it receives from procedure P1 508. The edge 520 between procedure $P_{unknown-1}$ and procedure P1 508 and the edge 522 between procedure $P_{unknown-2}$ and procedure P2 514 are not annotated because these calls originate from unknown procedures. Therefore, the values of the parameters passed to the known procedures P1 508 and P2 514 are unknown.

The problem arises in attempting to perform IPA optimization on those procedures that are externally callable, such as procedure P1 508 and P2 514. Due to the uncertainty of the incoming parameter values, the procedures P1 508 and P2 514 cannot be optimized with respect to their parameters. Conventional IPA compilation systems cannot handle a call graph with unknown, or non-annotated, edges. Therefore, these conventional IPA systems are limited because they cannot process an incomplete call graph.

5. The Preferred Embodiment of Constant Propagation for Unknown Edges

Figure 6:
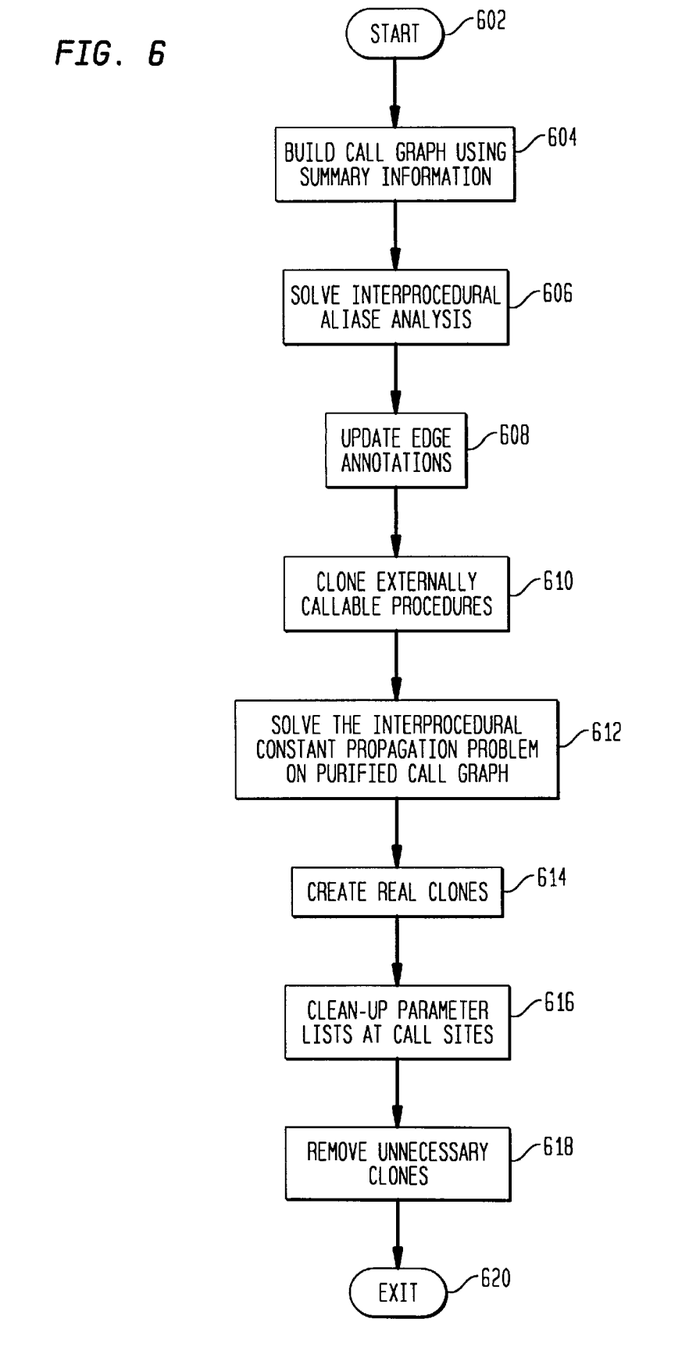
FIG. 6 is a control flow diagram representing the operation of the preferred embodiment of the present invention for constant propagation cloning.

The preferred embodiment of the present invention provides constant propagation in a call graph having unknown edges. FIG. 6 is a control flow diagram illustrating the operation of the preferred embodiment of constant propagation within an IPA compilation system. Control starts at step 602 and immediately proceeds to step 604. In step 604, the IPA/IPO phase 406 builds a call graph, as represented in FIG. 5, using the summary information in the intermediate ".0" files 404a–404n to annotate the edges of the call graph. It would be readily apparent to one skilled in the art to generate a call graph using the summary information.

Continuing to step 606, the IPA/IPO phase 406 solves the interprocedural alias analysis which includes computing the "mod" information for the formal parameters of each node, or procedure. More specifically, the IPA/IPO phase 406 determines whether a specific procedure can modify a parameter value or not. For those parameters that can be modified by a procedure, the IPA/IPO phase 406 assigns the appropriate edge with a "formal_mod" annotation.

Continuing to step 608, the IPA/IPO phase 406 updates those edges containing a "formal_mod" annotation. For those parameters that are not modified by the call, the IPA/IPO phase 406 removes the "formal_mod" annotation and replaces it with a "formal" annotation. For those parameters that are modified by the call, the IPA/IPO phase 406 removes the "formal_mod" annotation and replaces it with a "symbolic" or non-constant annotation.

Continuing to step 610, the IPA/IPO phase 406 clones the externally callable procedures of the call graph. Referring again to the call graph of FIG. 5, the externally callable procedures are procedures P1 508 and P2 514. Therefore, a clone of procedure PI 508 and a clone of procedure P2 514 are created in the call graph.

Figure 7:
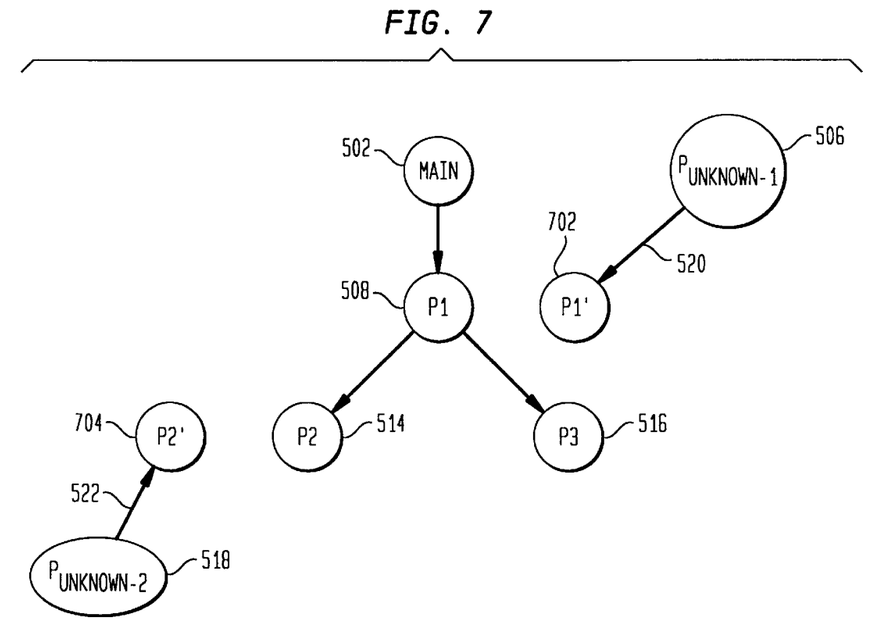
FIG. 7 is a block diagram illustrating a call graph with cloned nodes receiving unknown edges.

FIG. 7 is a block diagram illustrating the cloning of procedures P1 508 and P2 514. The clone of procedure P1 508 is procedure P1'702, and the clone of procedure P2 514 is procedure P2'704. More specifically, the IPA/IPO phase 406 creates new nodes on the call graph such that one new node is the clone procedure P1'702 and a second new node is the clone procedure P2' 704. At this step, the clones are a clone of the analysis of the procedures P1 508 and P2 514 and are not real clones of the procedures themselves.

After the clones P1'702 and P2'704 are created, the edges of the call graph are updated. The external, unknown edges are redrawn to point to the clone procedures. More specifically, unknown edge 520 is updated to point to clone procedure P1'702 and unknown edge 522 is updated to point to clone procedure P2'704. Step 610 results in a pure call graph in which there are no unknown edges and all edges have known parameter values.

Continuing to step 612, the IPA/IPO phase 406 can now solve the interprocedural constant propagation problem on the purified call graph. It is readily apparent to one skilled in the art to apply an iterative technique for solving constant propagation. It should also be understood, however, that the interprocedural problem being solved by the preferred embodiment of the present invention is constant propagation. Alternative embodiments could be implemented by one skilled in the art to solve comparable interprocedural problems.

Continuing to step 614, the IPA/IPO phase 406 traverses, in a well known manner, the nodes of the purified call graph for which a clone was created in step 610. For each such node, the IPA/IPO phase 406 creates a real clone. A real clone is an actual copy of the source code of an original procedure. The real clones are then optimized via constant propagation in a manner well known to one skilled in the art. Because the real clones are optimized for known calls, the calling procedures are then updated to call the real clones. Similarly, the original procedures remain unoptimized; therefore, the external procedures retain their call to the original procedures. This step results in known procedure calls taking advantage of IPA constant propagation optimization techniques, while unknown, external procedure calls are still allowed and take advantage of original, non-IPA optimized source code.

Figure 8:
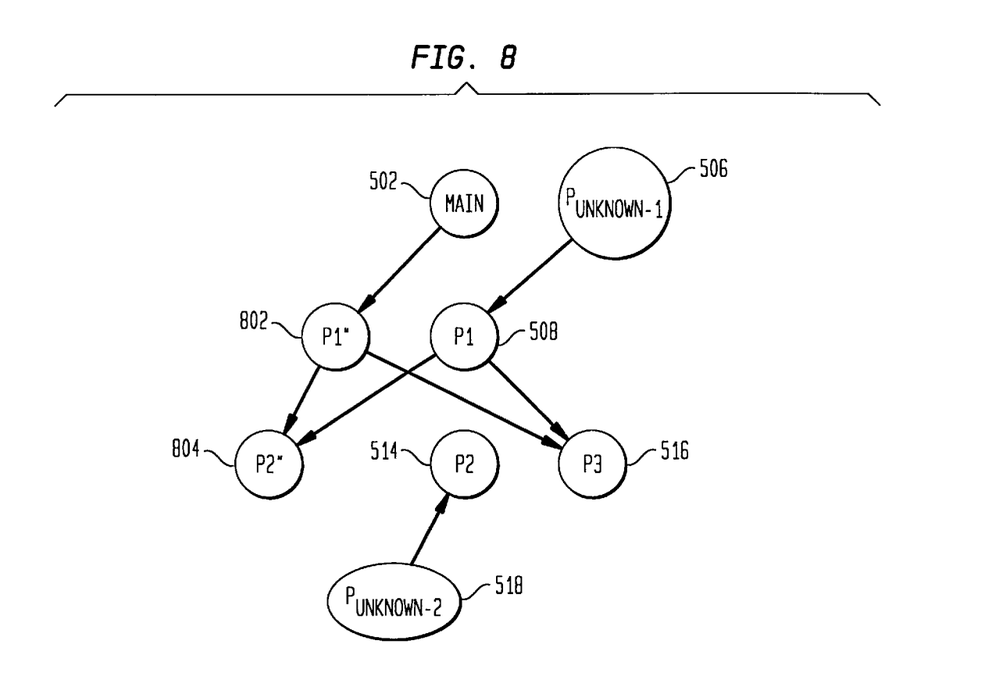
FIG. 8 is a block diagram illustrating the call graph with real clones receiving known calls.

Step 614 is illustrated in the block diagram of FIG. 8. In FIG. 8, real clones were created for procedures P1 508 and P2 514, called P1"802 and P2"804 respectively. Therefore, all calls to the original procedures P1 508 and P2 514 are updated accordingly. More specifically, procedure Main 502 is updated to call the real clone P1"802, and procedure P1 508 is updated to call the real clone P2"804. In addition, external procedure $P_{unknown-1}$ 506 retains its call to procedure P1 508, and procedure $P_{unknown-2}$ 518 retains its call to procedure P2 514.

Continuing to step 616, the IPA/IPO phase 406 cleans up the parameter lists at the new call sites as updated in step 614. This clean up includes eliminating constant parameters, thereby further optimizing the code.

Continuing to step 618, the IPA/IPO phase 406 cleans up the call graph by removing all unnecessary real clones. For example, if a real clone was created for a clone, but the original procedure of the real clone does not have any incoming constants, then the real clone could be removed. It should be understood, however, that real clones could be retained based on another criteria. For example, if after the constant propagation analysis, the interprocedural local phase 402 performs an array section analysis on the procedures in a call graph, a real clone may satisfy that second criteria, thereby be retained and not removed.

It should be understood that the use of clones and real clones as described above can be used in any interprocedural analysis problem in which there is incomplete or unknown information. The preferred embodiment is described in terms of constant propagation for convenience purpose only. It would be readily apparent to one skilled in the art to apply this present invention to other interprocedural analysis problems, including, but not limited to, section analysis.

Continuing to step 620, the IPA/IPO phase 406 exits this portion of its processing.

Conclusion

While various embodiments of the present invention have been described above, it should be understood that they have been presented by the way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined in accordance with the following claims and their equivalents.

What is claimed is:

1. A complete executed method for solving interprocedural problems on incomplete call graphs, comprising the steps of:
   (a) constructing a call graph having one or more nodes and one or more edges connecting said nodes, wherein each said node corresponds to a procedure in a computer program and each said edge corresponds to a procedure call;
   (b) updating said call graph with initial edge and node summary annotation information needed to solve a given interprocedural problem;
   (c) cloning said nodes having an unknown incoming edge, thereby creating one or more clones;
   (d) updating said call graph to reflect the creation of said clones created in step (c), thereby creating a purified call graph; and
   (e) solving said given interprocedural problem on said purified call graph.

2. The complete executed method of claim 1, further comprising:
   (f) creating a real clone for each clone created in step (c);
   (g) optimizing said real clone, thereby said real clone contains an optimized version of a procedure that solves said given interprocedural problem; and
   (h) updating procedure calls of said purified call graph to call said real clone, thereby creating updated procedure calls.

3. The complete executed method of claim 2, further comprising:
   (i) cleaning up said updated procedure calls of said purified call graph.

4. The complete executed method of claim 3, further comprising:
   (j) removing unnecessary real clones.

5. The complete executed method of claim 1, wherein said given interprocedural problem is constant propagation.

6. The complete executed method of claim 5, further comprising:
   (k) solving interprocedural alias analysis by determining whether a procedure can modify a parameter value;
   wherein step (k) is executed after step (a) and before step (b).

7. The complete executed method of claim 6, wherein step (b) comprises:
   (b.1) replacing a "formal_mod" annotation that corresponds to a parameter value of a procedure with a "formal" annotation, if it is determined in step (k) that said procedure corresponding to said "formal_mod" annotation cannot modify said parameter value; and
   (b.2) replacing said "formal_mod" annotation that corresponds to a parameter value of a procedure with a "symbolic" annotation, if it is determined in step (k) that said procedure corresponding to said "formal_mod" annotation can modify said parameter value.

8. The complete executed method of claim 5, wherein step (d) comprises:
   (d.1) redrawing unknown incoming edges of said call graph to point to said clones.

9. A computer system for solving interprocedural problems on incomplete call graphs, comprising:
   constructing means for constructing a call graph having one or more nodes and one or more edges connecting said nodes, wherein each said node corresponds to a procedure in a computer program and each said edge corresponds to a procedure call;
   first updating means for updating said call graph with initial edge and node summary annotation information needed to solve a given interprocedural problem;
   cloning means for cloning said nodes having an unknown incoming edge, thereby creating one or more clones;
   second updating means for updating said call graph to reflect the creation of said clones created by said cloning means, thereby creating a purified call graph; and solving means for solving said\given interprocedural problem on said purified call graph.

10. The computer system of claim 9, further comprising:

creating means for creating a real clone for each clone created by said cloning means;

optimizing means for optimizing said real clone, thereby said real clone contains an optimized version of a procedure that solves said given interprocedural problem; and third updating means for updating procedure calls of said purified call graph to call said real clone, thereby creating updated procedure calls.

11. The computer system of claim 10, further comprising:

cleaning means for cleaning up said updated procedure calls of said purified call graph.

12. The computer system of claim 11, further comprising:

removing means for removing unnecessary real clones.

13. The computer system of claim 9, wherein said given interprocedural problem is constant propagation.

14. The computer system of claim 13, further comprising:

second solving means for solving interprocedural alias analysis by determining whether a procedure can modify a parameter value;

wherein said second solving means is executed after said constructing means and before said first updating means.

15. The computer system of claim 14, wherein said first updating means comprises:

first replacing means for replacing a "formal_mod" annotation that corresponds to a parameter value of a procedure with a "formal" annotation, if it is determined by said second solving means that said procedure corresponding to said "formal_mod" annotation cannot modify said parameter value; and second replacing means for replacing said "formal_mod" annotation that corresponds to a parameter value of a procedure with a "symbolic" annotation, if it is determined by said second solving means that said procedure corresponding to said "formal_mod" annotation can modify said parameter value.

16. The computer system of claim 13, wherein said second updating means comprises:

redrawing means for redrawing unknown incoming edges of said call graph to point to said clones.

17. A computer program product for use with a computer system, comprising:

a computer usable medium having a computer readable program code means embodied in said medium for enabling a processor to solve interprocedural problems on incomplete call graphs, said computer program product having:

first program readable program code means for constructing a call graph having one or more nodes and one or more edges connecting said nodes, wherein each said node corresponds to a procedure in a computer program and each said edge corresponds to a procedure call;

second program readable program code means for updating said call graph with initial edge and node summary annotation information needed to solve a given interprocedural problem;

third program readable program code means for cloning said nodes having an unknown incoming edge, thereby creating one or more clones;

fourth program readable program code means for updating said call graph to reflect the creation of said clones created by said cloning means, thereby creating a purified call graph; and fifth program readable program code means for solving said given interprocedural problem on said purified call graph.

18. The computer program product of claim 17, further comprising:

sixth program readable program code means for creating a real clone for each clone created by said third program readable program code means;

seventh program readable program code means for optimizing said real clone, thereby said real clone contains an optimized version of a procedure that solves said given interprocedural problem; and eighth program readable program code means for updating procedure calls of said purified call graph to call said real clone, thereby creating updated procedure calls.

19. The computer program product of claim 18, further comprising:

ninth program readable program code means for cleaning up said updated procedure calls of said purified call graph.

20. The computer program product of claim 19, further comprising:

tenth program readable program code means for removing unnecessary real clones.

21. The computer program product of claim 17, wherein said given interprocedural problem is constant propagation.

22. The computer program product of claim 21, further comprising:

eleventh program readable program code means for solving interprocedural alias analysis by determining whether a procedure can modify a parameter value;

wherein said eleventh program readable program code means is executed after said first program readable program code means and before said second program readable program code means.

23. The computer program product of claim 22, wherein said second program readable program code means comprises:

first replacing means for replacing a "formal_mod" annotation that corresponds to a parameter value of a procedure with a "formal" annotation, if it is determined by said eleventh program readable program code means that said procedure corresponding to said "formal_mod" annotation cannot modify said parameter value; and second replacing means for replacing said "formal_mod" annotation that corresponds to a parameter value of a procedure with a "symbolic" annotation, if it is determined by said eleventh program readable program code means that said procedure corresponding to said "formal_mod" annotation can modify said parameter value.

24. The computer program product of claim 21, wherein said fourth program readable program code means comprises:

redrawing means for redrawing unknown incoming edges of said call graph to point to said clones.

* * * * *

UNITED STATES PATENT AND TRADEMARK OFFICE
CERTIFICATE OF CORRECTION

PATENT NO. : 5,812,855

DATED : September 22, 1998

INVENTORS : Hiranandani *et al.*

It is certified that an error appears in the above-identified patent and that said Letters Patent is hereby corrected as shown below.

In item 54 of the cover page, and also in Column 1, Line 1, delete the word "CONSTAINT" and insert the word --CONSTANT-- in place thereof;

In Column 13, Line 60, replace "complete" with --computer--;

In Column 14, Line 11, replace "complete" with --computer--;

In Column 14, Line 20, replace "complete" with --computer--;

In Column 14, Line 24, replace "complete" with --computer--;

In Column 14, Line 27, replace "complete" with --computer--;

In Column 14, Line 29, replace "complete" with --computer--;

In Column 14, Line 35, replace "complete" with --computer--;

In Column 14, Line 47, replace "complete" with --computer--.

Signed and Sealed this

Ninth Day of March, 1999

*Attest:*

Q. TODD DICKINSON

*Attesting Officer*

*Acting Commissioner of Patents and Trademarks*